United States Patent
Oh et al.

(10) Patent No.: US 9,483,074 B2
(45) Date of Patent: Nov. 1, 2016

(54) WATCH TYPE MOBILE TERMINAL AND MOBILE TERMINAL SYSTEM HAVING THE SAME

(71) Applicant: LG ELECTRONICS INC., Seoul (KR)

(72) Inventors: Gunseek Oh, Seoul (KR); Jongseok Park, Seoul (KR); Seongcheol Lee, Seoul (KR); Ramchan Woo, Seoul (KR); Youmgeun Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 14/592,491

(22) Filed: Jan. 8, 2015

(65) Prior Publication Data

US 2015/0331446 A1   Nov. 19, 2015

(30) Foreign Application Priority Data

May 19, 2014  (KR) .......................... 10-2014-0059898

(51) Int. Cl.
  *G06F 1/16*  (2006.01)
(52) U.S. Cl.
  CPC ..................................... *G06F 1/163* (2013.01)
(58) Field of Classification Search
  CPC ........ G06F 1/16; G06F 1/163; G06F 1/1622; G06F 1/1626; G06F 1/1632; H01R 9/096; H01R 13/2435; H01R 12/52; H01R 12/716; H01R 13/02
  USPC .............. 361/679.01, 679.02, 679.03, 679.3, 361/679.41–679.44, 679.56; 455/575.1–575.8; 439/74, 75, 76.1, 439/248, 928.1, 929
  See application file for complete search history.

(56) References Cited

U.S. PATENT DOCUMENTS

| | | | | |
|---|---|---|---|---|
| 6,454,608 B1* | 9/2002 | Kitahara | ............ | H01R 13/2421 439/358 |
| 7,006,408 B2* | 2/2006 | Chen | .................. | G04B 37/1486 368/10 |
| 8,620,395 B2* | 12/2013 | Kang | ...................... | H04M 1/02 174/50 |
| 2001/0004397 A1* | 6/2001 | Kita | ....................... | G04G 21/00 381/334 |
| 2009/0156255 A1* | 6/2009 | Shin | ........................ | H04B 1/385 455/558 |
| 2010/0112949 A1* | 5/2010 | Kim | ................... | H01R 13/2421 455/41.3 |
| 2011/0053666 A1* | 3/2011 | Kang | ...................... | H04M 1/02 455/575.6 |
| 2015/0137731 A1* | 5/2015 | Kim | ....................... | H02J 7/355 320/101 |

FOREIGN PATENT DOCUMENTS

WO      2004075345 A2   9/2004

* cited by examiner

*Primary Examiner* — Courtney Smith
*Assistant Examiner* — Sagar Shrestha
(74) *Attorney, Agent, or Firm* — Dentons US LLP

(57) ABSTRACT

Disclosed is a watch-type mobile terminal, and a watch-type mobile terminal system having the same. The watch-type mobile terminal includes: a terminal body configured to be mountable to a mounting device having a contact pin, and having a first case and a second case which form an inner space of the terminal body by being coupled to each other; a printed circuit board disposed at the inner space; and a coupling member configured to couple the first case and the second case to each other by passing through the printed circuit board, and electrically connected to the printed circuit board, wherein when the terminal body is mounted to the mounting device, the coupling member contacts the contact pin to thus electrically-connect the printed circuit board and the mounting device to each other.

20 Claims, 9 Drawing Sheets

WATCH TYPE MOBILE TERMINAL AND MOBILE TERMINAL SYSTEM HAVING THE SAME

CROSS-REFERENCE TO RELATED APPLICATION

Pursuant to 35 U.S.C. §119(a), this application claims the benefit of earlier filing date and right of priority to Korean Application No. 10-2014-0059898, filed on May 19, 2014, the contents of which is incorporated by reference herein in its entirety.

BACKGROUND OF THE DISCLOSURE

1. Field of the Disclosure

This specification relates to a mobile terminal, and more particularly, a watch-type mobile terminal configured to be wearable on a user's wrist, and a mobile terminal system having the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

Owing to such attempts, the mobile terminal is being evolved to have various designs and a wearable device configured to be wearable on a user's body is being spotlighted. As such wearable device is being spotlighted, a user interface according to a shape and characteristics of the wearable device is required.

SUMMARY OF THE DISCLOSURE

Therefore, an aspect of the detailed description is to provide a watch-type mobile terminal capable of providing a new electrical connection structure between the watch-type mobile terminal wearable on a user's wrist and a mounting device.

To achieve these and other advantages and in accordance with the purpose of this specification, as embodied and broadly described herein, there is provided a watch-type mobile terminal, including: a terminal body configured to be mountable to a mounting device having a contact pin, and having a first case and a second case which form an inner space of the terminal body by being coupled to each other; a printed circuit board disposed at the inner space; and a coupling member configured to couple the first case and the second case to each other by passing through the printed circuit board, and electrically connected to the printed circuit board, wherein when the terminal body is mounted to the mounting device, the coupling member contacts the contact pin to thus electrically-connect the printed circuit board and the mounting device to each other.

In an embodiment, the coupling member may be one of coupling members disposed at corners of the first case.

In another embodiment, a coupling hole for inserting the coupling member may be formed at the first case. And the coupling member may be inserted into the coupling hole with remaining a predetermined empty space above the coupling member, such that the contact pin is inserted into the empty space when the terminal body is mounted to the mounting device.

The watch-type mobile terminal may further include a sealing member disposed between a head portion of the coupling member and a mounting surface of the coupling hole where the head portion is mounted, the sealing member configured to seal the coupling hole.

The coupling member may be screw-coupled to the first and second cases. When the coupling member is screw-coupled to the first and second cases, the sealing member may be elastically pressed by the head portion to thus be adhered to the mounting surface.

A recess portion, recessed in correspondence to at least part of the contact pin so as to insert said at least part of the contact pin, may be formed at the head portion of the coupling member exposed to outside by being mounted to the mounting surface of the coupling hole.

In still another embodiment, a through hole, through which the coupling member passes, may be formed at the printed circuit board. A connection portion, electrically-connected to a circuit portion of the printed circuit board by contacting the coupling member, may be provided on an inner side wall of the through hole.

The connection portion may be configured in the form of a loop along an inner side wall of the through hole, so as to contact an outer circumferential surface of the coupling member when the coupling member is inserted into the through hole.

The connection portion may be integrally formed with the circuit portion.

In still another embodiment, a through hole, through which the coupling member passes, may be formed at the printed circuit board. The watch-type mobile terminal may further include a connection member mounted to the printed circuit board and formed to be electrically connected to the circuit portion of the printed circuit board, the connection member provided with a hole corresponding to the through hole so as to contact the coupling member when the coupling member is coupled to the first and second cases.

The connection member may be mounted to the printed circuit board, and may be screw-coupled to the coupling member.

In still another embodiment, the coupling member may include a first magnetic substance such that an attractive force is applied between the coupling member and the contact pin formed of a metallic material.

The contact pin may include a second magnetic substance having a different polarity from the coupling member. And the coupling member may be formed to have the same polarity as a non-corresponding contact pin rather than a corresponding contact pin, such that a repulsive force is applied when the coupling member is close to the non-corresponding contact pin.

In still another embodiment, the first case may be mounted to cover a rear side opening of the second case, and a window may be mounted to a front side opening of the second case.

To achieve these and other advantages and in accordance with the purpose of this specification, as embodied and broadly described herein, there is also provided a watch-type mobile terminal system, including: a watch-type mobile terminal; and a mounting device having a contact pin, and configured to mount the watch-type mobile terminal, wherein the watch-type mobile terminal includes: a first case and a second case configured to form an inner space of the terminal body by being coupled to each other; a printed circuit board disposed at the inner space; and a coupling member configured to couple the first case and the second case to each other by passing through the printed circuit board, and electrically connected to the printed circuit board, wherein when the terminal body is mounted to the mounting device, the coupling member contacts the contact pin to thus electrically-connect the watch-type mobile terminal and the mounting device to each other.

In an embodiment, the mounting device may further include a holding guide protruding from a mounting device body in correspondence to an outer appearance of the watch-type mobile terminal, the holding guide configured to guide a mounted state of the watch-type mobile terminal.

The contact pin may be one of contact pins arranged at corners of the holding guide.

In another embodiment, a coupling hole for inserting the coupling member may be formed at the first case. And the coupling member may be inserted into the coupling hole with remaining a predetermined empty space above the coupling member, such that the contact pin is inserted into the empty space when the terminal body is mounted to the mounting device.

The contact pin may be formed to be compressible and tensile along an axial direction, so as to elastically press the coupling member by being inserted into the empty space of the coupling hole when the watch-type mobile terminal is mounted to the mounting device.

In still another embodiment, the coupling member may include a first magnetic substance, and the contact pin may include a second magnetic substance having a different polarity from the coupling member. And the coupling member may be formed to have the same polarity as a non-corresponding contact pin rather than a corresponding contact pin, such that a repulsive force is applied when the coupling member is close to the non-corresponding contact pin.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1:
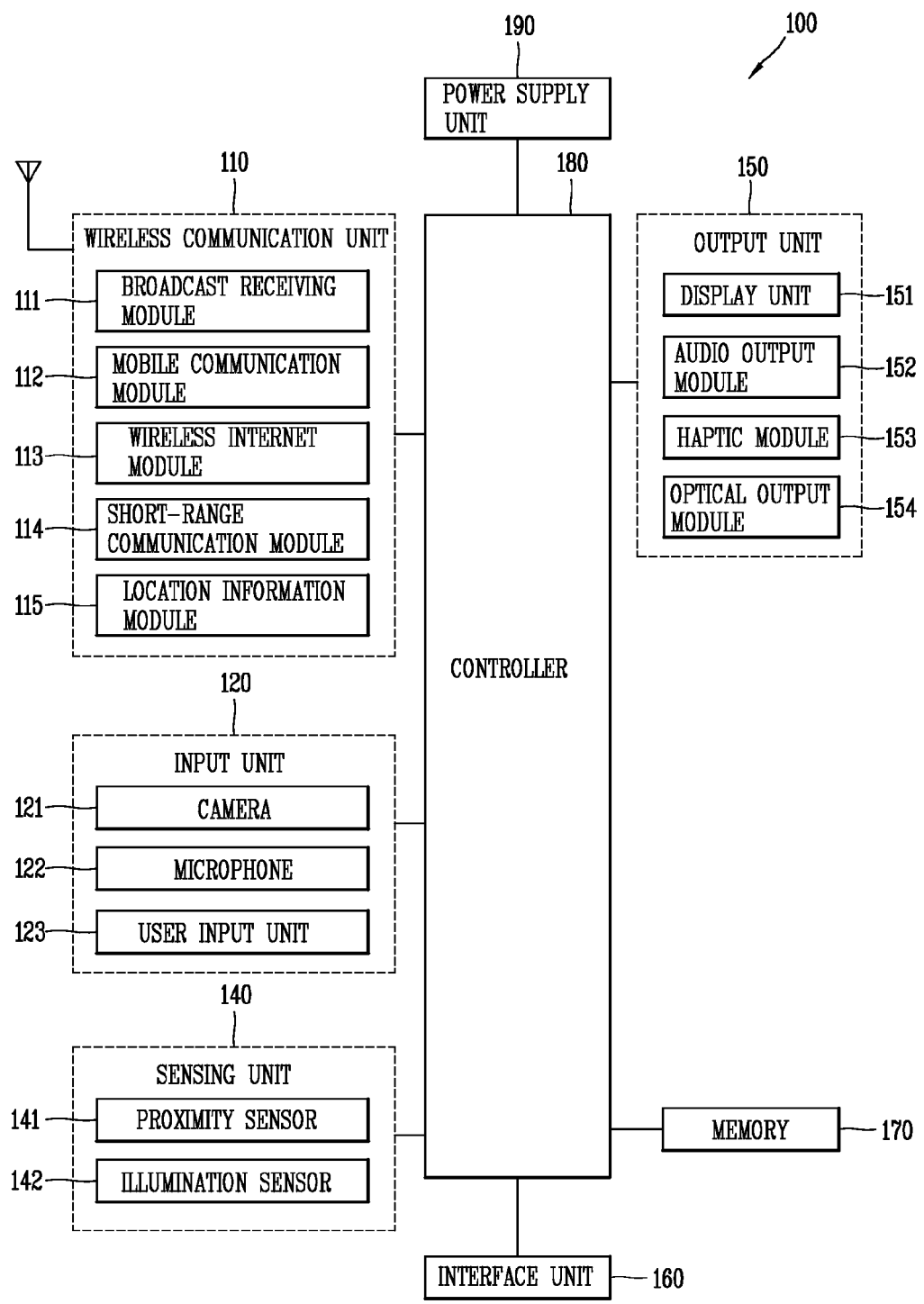
FIG. 1 is a block diagram for explaining a mobile terminal according to the present invention.

FIG. 1 is a block diagram illustrating the configuration of a mobile terminal 100 according to an embodiment of the present invention.

Referring to FIG. 1, the mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the above components may cooperate with each other, so as to control an operation of a mobile terminal according to various embodiments to be explained later. A method of controlling a mobile terminal may be implemented on the mobile terminal, by driving at least one application program stored in the memory 170.

The mobile terminal 100 may be configured as a wearable device which can be worn on a human body, beyond the conventional technique of a user grasping the mobile terminal using his or her hand. Such wearable device may be configured to exchange data with other mobile terminal.

Such wearable device may include a smart watch, a smart glass, a head mounted display (HMD), etc. Hereinafter, a watch-type mobile terminal system, which includes the mobile terminal 100 configured as a watch type such as a smart watch and a mounting device for mounting the mobile terminal, will be explained.

Figure 2:
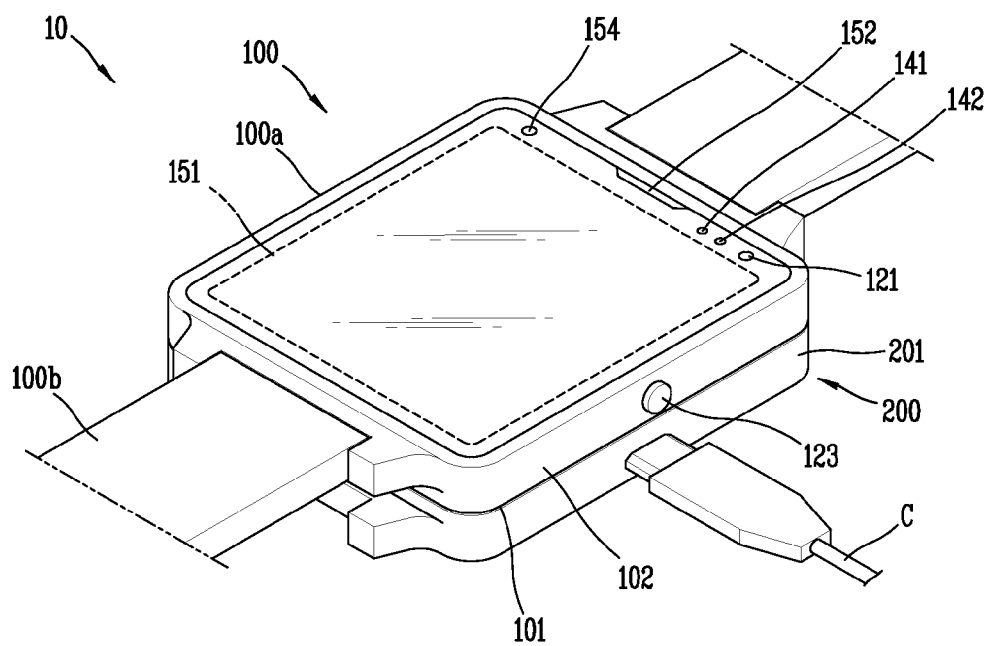
FIG. 2 is a conceptual view illustrating an example of a watch-type mobile terminal system according to the present invention.
Figure 3A:
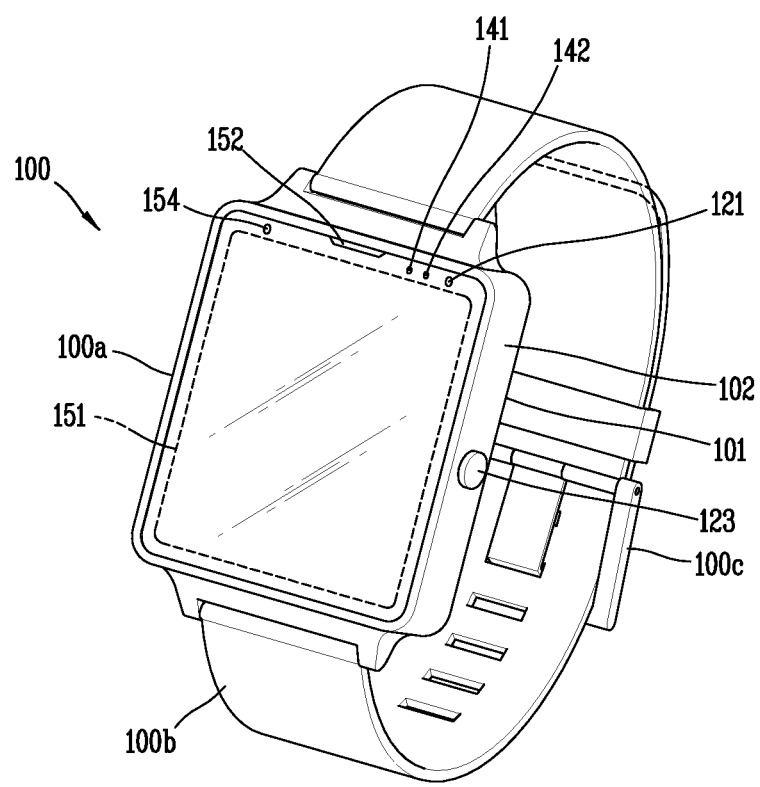
FIGS. 3A and 3B are a perspective view and a rear view of the mobile terminal shown in FIG. 2, respectively.
Figure 3B:
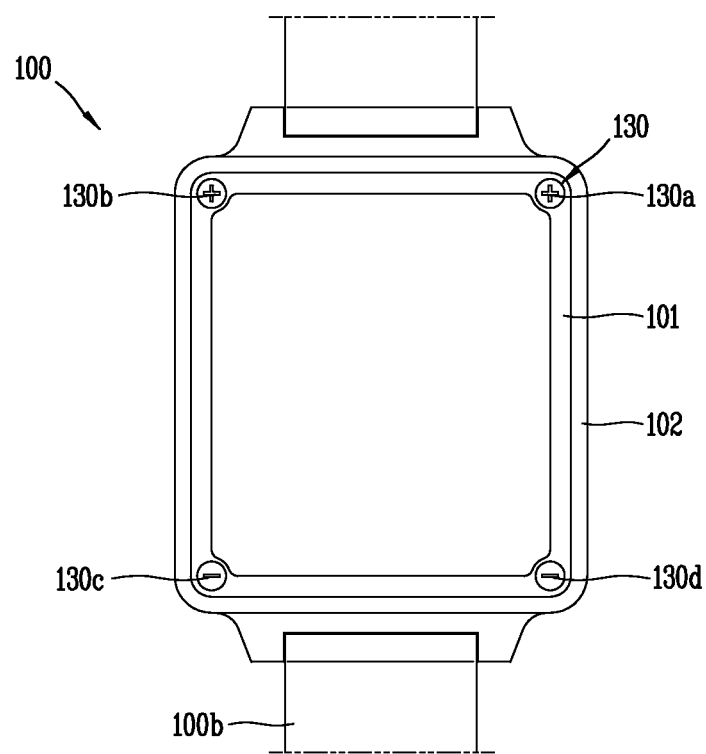
Figure 4:
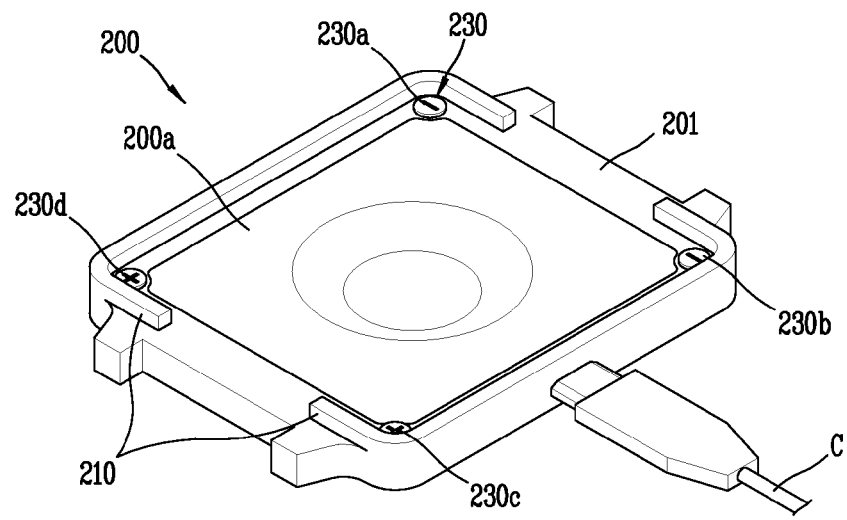
FIG. 4 is a perspective view of a mounting device shown in FIG. 2.

FIG. 2 is a conceptual view illustrating an example of a watch-type mobile terminal system 10 according to the present invention. FIGS. 3A and 3B are a perspective view and a rear view of a mobile terminal 100 shown in FIG. 2, respectively. FIG. 4 is a perspective view of a mounting device 200 shown in FIG. 2.

Referring to FIGS. 2 to 4, the watch-type mobile terminal system 10 includes a mobile terminal 100, and a mounting device 200 configured to mount the mobile terminal 100.

The watch-type mobile terminal 100 includes a terminal body 100a having a display unit 151, and a band 100b connected to the terminal body 100a and configured to be wearable on a user's wrist.

The terminal body 100a includes cases 101 and 102 forming appearance of the terminal body 100a. As shown, the cases 101 and 102 may include a first case 101 and a second case 102 each having an inner space for accommodating various types of electronic components. In this embodiment, the first case 101 is mounted to cover a rear side opening of the second case 102, and a window 151a is mounted to a front side opening of the second case 102.

The watch-type mobile terminal 100 is configured to perform wireless communication, and an antenna for such wireless communication may be installed at the terminal body 100a. The antenna may extend its function using the cases 101 and 102. For instance, the cases 101 and 102 including a conductive material may be configured to extend a ground region or a radiation region by being electrically connected to the antenna.

The display unit 151 may be disposed on a front surface of the terminal body 100a to output information. A touch sensor may be provided at the display unit 151 to thus be implemented as a touch screen. As shown, the window 151a of the display unit 151 may be mounted to the second case 102, thereby forming a front surface of the terminal body together with the first case 101.

The audio output unit 152, the camera 121, the microphone 122, the user input unit 123, etc. may be provided at the terminal body 100a. In a case where the display unit 151 is configured as a touch screen, the display unit 151 may serve as the user input unit 123. In this case, no additional key may be provided at the terminal body 100a.

The band 100b, wearable on a wrist in an enclosing manner, may be formed of a flexible material. For instance, the band 100b may be formed of leather, rubber, silicon, synthetic resin, etc. The band 100b may be detachably mounted to the terminal body 100a so that it can be replaced by any one of various types of bands according to a user's preference. In the drawings, the band 100b is connected to the second case 102.

The band 100b may be used to extend a function of an antenna. For instance, a ground extension portion (not shown) configured to extend a ground region by being electrically connected to an antenna, may be mounted in the band 100b.

The band 100b may be provided with a fastener 100c. The fastener 100c may be implemented as a buckle, a snap-fittable hook structure, a Velcro (trademark name), etc. The band 10b may include an elastic section, or may be formed of an elastic material. In the drawings, the fastener 100c is implemented in the form of a buckle.

The mobile terminal 100 is configured to be mounted to the mounting device 200. The mobile terminal 100 may be configured to be mounted to the mounting device so as to receive charging power from the mounting device, or so as to perform data communication with an external device electrically connected to the mounting device 200.

The mounting device 200 is provided with an accommodation portion 200a laid on a bottom surface or fixed to a wall surface, the accommodation portion 2001 configured to accommodate therein at least part of the mobile terminal 100 so that the mobile terminal 100 can be mounted. As shown, the accommodation portion 200a may be formed to accommodate the terminal body 100a therein.

An external device may be electrically connected to the mounting device 200 through a cable (C). A printed circuit board 220 (refer to FIG. 5) is disposed in the mounting device 200, and a contact pin 230 for electrical connection with the mobile terminal 100 is mounted to the PCB 220. At least part of the contact pin 230 protrudes from the accommodation portion 200a. Once the terminal body 100a is accommodated in the accommodation portion 200a, the contact pin 230 is made to contact a terminal (a coupling member 130 to be explained later) provided at the terminal body 100a.

The mobile terminal 100 of the present invention is provided with a structure where a coupling structure between the first case 101 and the second case 102, and an electrical connection structure between the mobile terminal 100 and the mounting device 200 has been integrated with each other. Hereinafter, such integrated structure will be explained in more detail.

Figure 5:
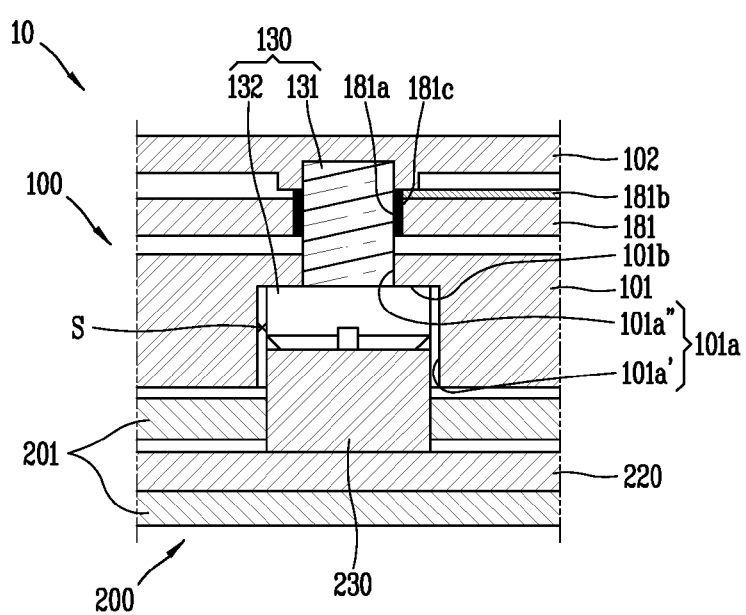
FIG. 5 is a sectional view illustrating part 'A' shown in FIG. 2, i.e., an electrical connection structure between a mobile terminal and a mounting device.

FIG. 5 is a sectional view illustrating part 'A' shown in FIG. 2, i.e., an electrical connection structure between the mobile terminal 100 and the mounting device 200.

Referring to FIG. 5, the first case 101 and the second case 102 are coupled to each other to form an inner space of the terminal body 100a. In this embodiment, when a user has worn the watch-type mobile terminal 100 on his or her wrist, the first case 101 may be understood as a rear case disposed on the wrist, and the second case 102 may be understood as a front case exposed to outside.

A printed circuit board 181 is disposed at the inner space. The PCB 181 may be mounted to the first case 101. The PCB 181 may be configured as an example of the controller 180 (refer to FIG. 1) for operating various functions of the watch-type mobile terminal 100, and various types of electronic components may be mounted to at least one surface of the PCB 181.

A coupling member 130 is configured to couple the first case 101 and the second case 102 to each other. The coupling member 130 may be screw-coupled to the first case 101 and the second case 102. As the coupling member 130, well-known screws may be generally used.

As shown, while coupling the first case 101 and the second case 102 to each other, the coupling member 130 penetrates the PCB 181 to be electrically connected to the PCB 181, That is, the coupling member 130 may be inserted into the first case 101, and may be coupled to the second case 102 by passing through the PCB 181. Under such coupling structure, an end portion of the coupling member 130, i.e., a head portion 132 is exposed to outside from the first case 101.

The coupling member 130 is disposed at a position corresponding to the contact pin 230 so as to contact the contact pin 230 when the terminal body 100a is mounted to the mounting device 200. The coupling member 130 is formed of a conductive metallic material. Accordingly, when the terminal body 100a is mounted to the mounting device 200, the coupling member 130 contacts the contact pin 230 to thus electrically connect the PCB 181 and the mounting device 200 to each other. That is, the coupling member 130 performs not only its own function (coupling function between the first case 101 and the second case 102), but also an electrical connection function between the watch-type mobile terminal 100 and the mounting device 200.

For electrical connection between a mobile terminal and a mounting device, it is general for the mobile terminal to be provided with a terminal configured to contact a contact pin of the mounting device. However, in the present invention, the watch-type mobile terminal 100 requires no additional terminal because the coupling member 130 also performs such electrical connection function. Thus, appearance of the watch-type mobile terminal 100 can become more simple and sophisticated.

The coupling member 130 may be provided at the watch-type mobile terminal 100 in at least one in number. FIG. 3B illustrates that coupling members 130a, 130b, 130c and 130d have been disposed at corners of the first case 101, respectively. The coupling member 130a, 130b, 130c and 130d may serve as terminals for performing different functions. For instance, the coupling members 130a, 130b, 130c and 130d may be disposed at corners of the first case 101 having a quadrangular shape, and may serve as VBUS, D–, D+ and GND terminals, respectively.

As the coupling members 130a, 130b, 130c and 130d are arranged in a spaced (distant) manner, a malfunction and a short-circuit, occurring from the conventional structure where terminals are arranged in a compact manner, can be prevented.

Under such structure of the present invention, the coupling member 130 and the contact pin 230 can be fabricated to have a larger size than the conventional ones. Accordingly, a charging current can be increased and thus the watch-type mobile terminal 100 can be charged more rapidly.

Hereinafter, an electrical connection structure between the coupling member 130 and the PCB 181 will be explained in more detail.

As shown, a circuit portion 181b is formed on at least one surface of the PCB 181, and the circuit portion 181b is connected to the power supply unit 190, the memory 170, etc. A through hole 181a, through which the coupling member 130 passes, is formed at the PCB 181. A connection portion 181c, electrically-connected to the circuit portion 181b by contacting the coupling member 130, is provided on an inner side wall of the through hole 181a.

The connection portion 181c may be configured in the form of a loop along an inner side wall of the through hole 181a, so as to contact an outer circumferential surface of the coupling member 130 when the coupling member 130 is inserted into the through hole 181a. The connection portion 181c may be integrally formed with the circuit portion 181b. For instance, in a case where the circuit portion 181b is formed on a substrate made of an insulating material in a preset pattern, the connection portion 181c contacting the coupling member 130 may be implemented as the circuit portion 181b partially extends to be formed on an inner side wall of the through hole 181a.

A thread groove, corresponding to a screw thread of the coupling member 130, may be formed on an inner side wall of the through hole 181a. Under such structure, the coupling member 130 may be coupled to the PCB 181 by screw-coupling, so that the PCB 181 can be fixed more firmly, and the coupling member 130 and the connection portion 181c can be connected to each other more stably.

The watch-type mobile terminal system 10 may be provided with a structure for stable contact between the coupling member 130 and the contact pin 230. Hereinafter, such structure will be explained in more detail As can be seen from FIGS. 2 and 4, the mounting device 200 may be provided with a holding guide 210 protruding from a mounting device body 201 in correspondence to an outer appearance of the watch-type mobile terminal 100. The holding guide 210 may be formed to exclude part corresponding to the band 100b, so that the band 100b can be mounted to the holding guide 210 provided at two sides of the mounting device 200. Since the accommodation portion 200a for accommodating at least part of the watch-type mobile terminal 100 is defined by the holding guide 210, the watch-type mobile terminal 100 can be mounted to a precise position.

As aforementioned, the coupling member 130 may be arranged at each corner of the first case 101. Thus, the contact pin 230 may be arranged at each corner of the holding guide 210.

A coupling hole 101a for inserting the coupling member 130 thereinto is formed at the first case 101. As shown, the coupling hole 101a may include a first hole 101a' communicated with outside, and a second hole 101a" for inserting a body portion 131 of the coupling member 130 thereinto. The first hole 101a' is formed to have a diameter larger than that of the second hole 101a", and a mounting surface 101b for mounting a head portion 132 of the coupling member 130 is formed on a bottom surface of the first hole 101a'. That is, the head portion 132 is mounted to the mounting surface 101b, and is exposed to outside through the first hole 101a'.

Under such coupling structure, the coupling member 130 may be inserted into the coupling hole with remaining a predetermined empty space (S) above the coupling member 130, such that the contact pin 230 is inserted into the empty space (S) when the watch-type mobile terminal 100 is mounted to the mounting device 200. That is, if the head portion 132 is mounted to the mounting surface 101b as the coupling member 130 is completely coupled to the coupling hole, the empty space (S) is formed above the coupling member 130 with a depth. The depth corresponds to a value obtained by deducting a height of the head portion 132, from a depth of the first hole 101a'.

The contact pin 230 is inserted into the empty space (S) when the watch-type mobile terminal 100 is mounted to the mounting device 200. Then the contact pin 230 inserted into the empty space (S) comes in contact with the head portion 132 of the coupling member 130. Under such structure, stable contact between the coupling member 130 and the contact pin 230 can be maintained, even if the watch-type mobile terminal 100 is moved toward a side direction by an unintended external force.

In the drawings, the contact pin 230 was illustrated conceptually. The contact pin 230 may be configured to protrude from the mounting device 200, or may be configured to be elastically transformable. Hereinafter, another example of the contact pin 230 shown in FIG. 5 will be explained in more detail with reference to FIGS. 6A and 6B.

Figure 6A:
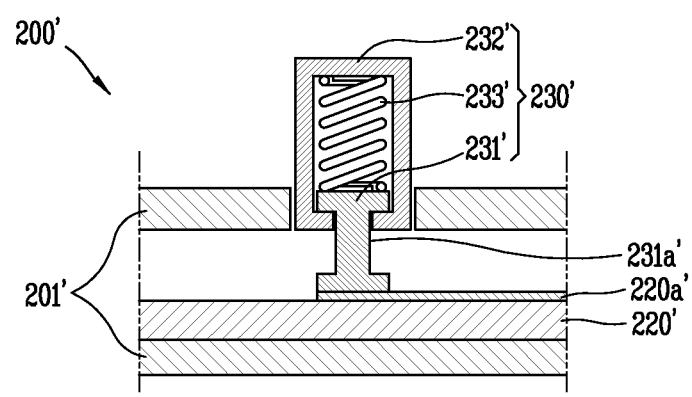
FIGS. 6A and 6B are conceptual views illustrating another example of a contact pin shown in FIG. 5.

Referring to FIG. 6A, a contact pin 230' is formed to extend to one direction so that at least part thereof can protrude from the mounting device 200', and is formed to be compressible and tensile along an axial direction.

More specifically, the contact pin 230' includes a first pin 231', a second pin 232' and an elastic member 233'.

The first pin 231' is mounted to a printed circuit board (PCB) 220', and is electrically connected to a circuit portion 220a'. The second pin 232' is disposed to accommodate therein at least part of the first pin 231', and is configured to be movable along an axial direction of the first pin 231'. The elastic member 233' is supported at an end portion of the first pin 231' and an inner side wall of the second pin 232', respectively, thereby enabling the second pin 232' to elastically behave along an axial direction of the first pin 231'. An end portion of the second pin 232' may be inserted into an accommodation groove 231a' of the first pin 231', for prevention of separation of the second pin 232' due to a tensile force of the elastic member 233'.

Figure 6B:
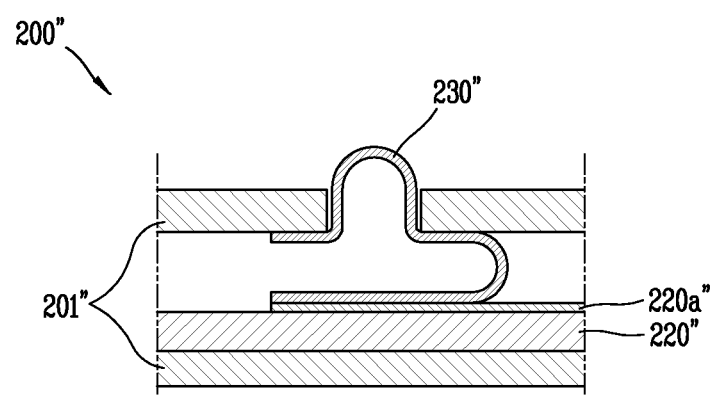

Referring to FIG. 6B, a contact pin 230" may be configured in the form of a clip mounted to a printed circuit board (PCB) 220", the clip elastically movable toward inside and outside of a mounting device 200" by being partially or wholly exposed to the mounting device 200".

The above configurations exemplarily illustrate the elastically-transformable contact pins 230, 230' and 230". Thus, the present invention is not limited to such contact pins 230, 230' and 230". That is, other type of known elastically-transformable contact pin can be also applied to the contact pin 230 of the present invention.

In a case where the contact pins 230' and 230" are configured to be elastically-transformable, the contact pins 230' and 230" elastically press the coupling member 130. Thus, contact between the coupling member 130 and the contact pins 230' and 230" can be maintained more stably.

Figure 7:
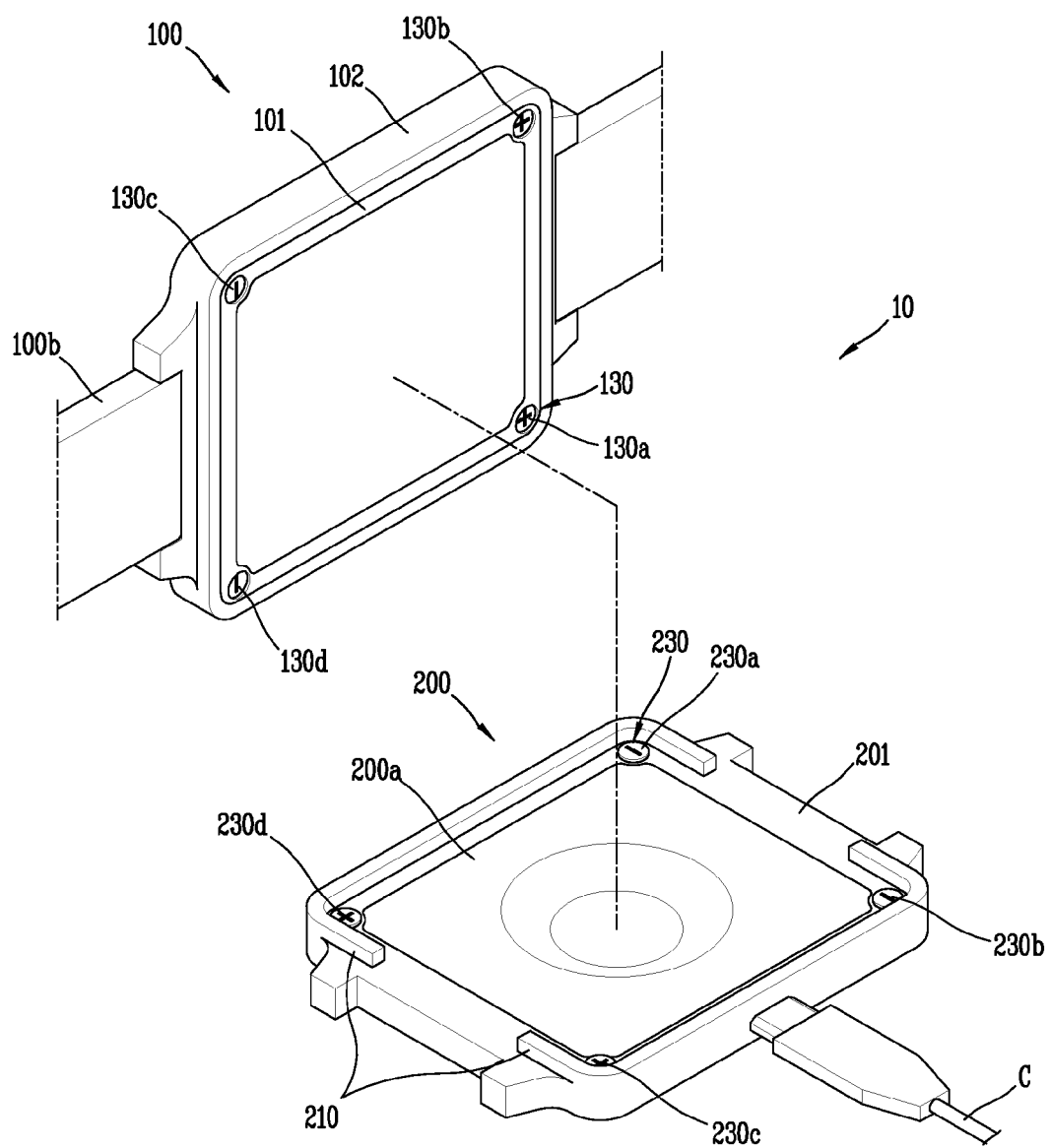
FIG. 7 is a conceptual view illustrating a structure to prevent a mounted state in a reverse direction in a case where the mobile terminal of FIG. 2 is mounted to a mounting device.

FIG. 7 is a conceptual view illustrating a structure to prevent a mounted state in a reverse direction in a case where the watch-type mobile terminal of FIG. 2 is mounted to a mounting device.

The coupling member 130 may include a first magnetic substance so that an attractive force can be applied between the coupling member 130 and a corresponding contact pin 230 formed of a metallic material. Under such structure, if the terminal body 100a is disposed close to the accommodation portion 200a, the terminal body 100a may be accommodated in the accommodation portion 200a as an attractive force is applied between the coupling member 130 and the contact pin 230. And the coupling member 130 and the contact pin 230 may contact each other more stably by a magnetic force.

In some cases, the watch-type mobile terminal 100 may be arranged on the mounting device 200 in a rotated state (180° in the drawing). If the coupling member 130 contacts the non-corresponding contact pin 230 in a state where the watch-type mobile terminal 100 has been arranged in a reverse direction, not in a forward direction, a malfunction of the watch-type mobile terminal 100 may occur or the watch-type mobile terminal 100 or the mounting device 200 may have a circuit defection.

In order to prevent such mounted state in a reverse direction, the contact pin 230 may include a second magnetic substance having a different polarity from the coupling member 130. And the coupling member 130 may be formed to have the same polarity as a non-corresponding contact pin 230 rather than a corresponding contact pin 230, such that a repulsive force is applied when the coupling member 130 is close to the non-corresponding contact pin 230.

For instance, as shown, the coupling member 130a is formed to have a positive (+) polarity, and the corresponding contact pin 230a is formed to have a negative (−) polarity. If the watch-type mobile terminal 100 is arranged on the mounting device 200 in a rotated state by 180°, the coupling member 130a is disposed to face a contact pin 230c having a positive (+) polarity. As a result, a repulsive force occurs between the coupling member 130a and the contact pin 230c. Accordingly, a mounted state of the watch-type mobile terminal 100 in a reverse direction can be prevented.

Figure 8A:
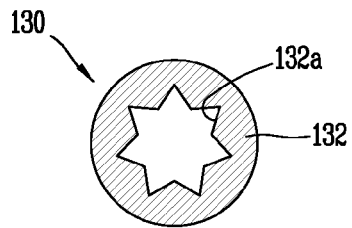
FIGS. 8A and 8B are conceptual views illustrating an end portion of a coupling member shown in FIG. 3B, and an end portion of a contact pin shown in FIG. 4, respectively.
Figure 8B:
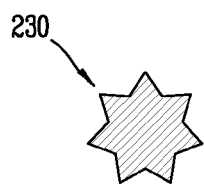

FIGS. 8A and 8B are conceptual views illustrating an end portion of the coupling member 130 shown in FIG. 3B, and an end portion of the contact pin 230 shown in FIG. 4, respectively.

Referring to FIGS. 8A and 8B, a recess portion 132a, recessed in correspondence to at least part of the contact pin 230 so as to insert said at least part of the contact pin 230, may be formed at the head portion 132 of the coupling member 130 exposed to outside by being mounted to the mounting surface of the coupling hole 101a. As shown, the contact pin 230 may be formed to have the same shape as the recess portion 132a, or may be formed to have a shape corresponding to at least part of the recess portion 132a.

Under such structure, as the contact pin 230 is inserted into the recess portion 132a of the coupling member 130, the contact pin 230 and the coupling member 130 can be fixedly-coupled to each other more stably.

The shape of the contact pin 230 and the recess portion 132a is not limited to the illustrated one, but may be modified to various shapes.

Figure 9:
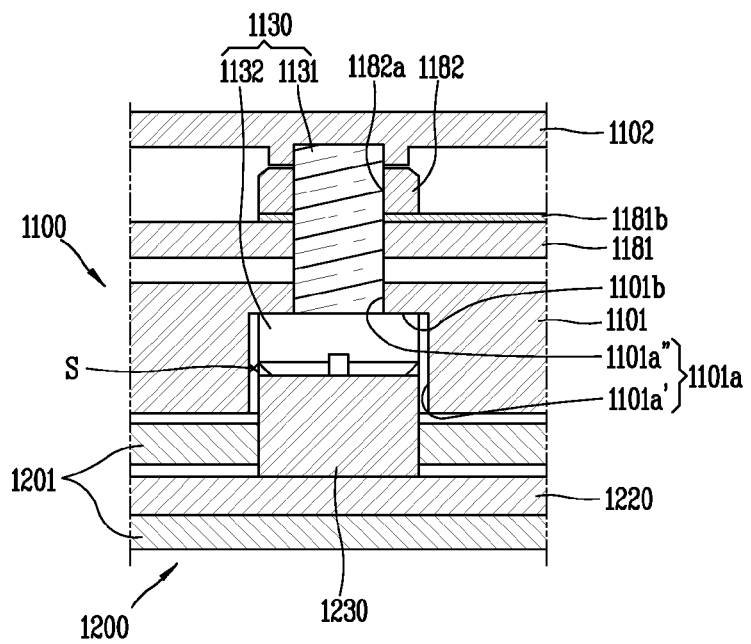
FIGS. 9 and 10 are conceptual views illustrating another example of the electrical connection structure between the mobile terminal and the mounting device shown in FIG. 5.
Figure 10:
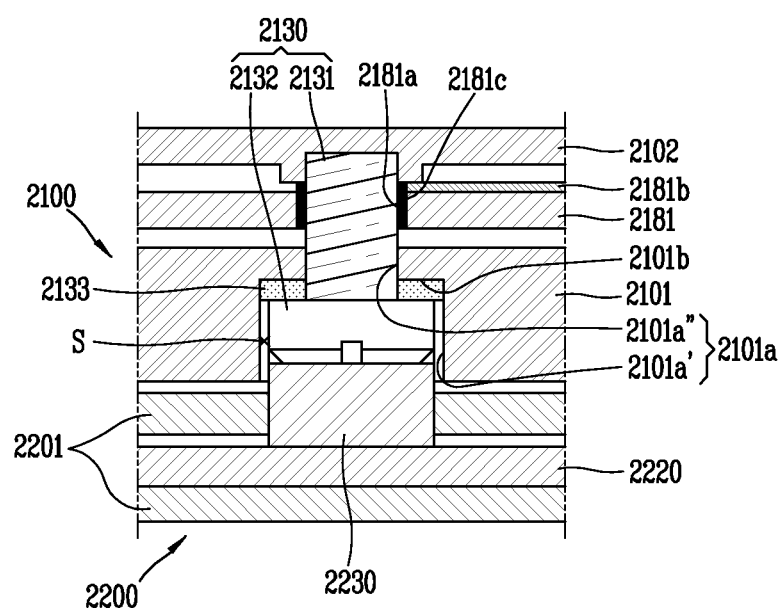

FIGS. 9 and 10 are conceptual views illustrating another example of an electrical connection structure between a mobile terminal 1100 and a mounting device 1200 shown in FIG. 5.

Referring to FIG. 9, a connection member 1182, formed to be electrically connected to a circuit portion 1181b, is mounted to a printed circuit board (PCB) 1181. In the drawings, the connection member 1182 is disposed between the PCB 1181 an a second case 1102, and is arranged to cover at least part of the circuit portion 1181b.

The connection member 1182 is provided with a hole 1182a corresponding to a through hole 1181a of the PCB 1181. Under such structure, a coupling member 1130 is coupled to the second case 1102, via a first case 1101, the PCB 1181 and the connection member 1182, sequentially. As a result, the coupling member 1130 comes in contact with the connection member 1182, thereby being electrically connected to the circuit portion 1181b.

The connection member 1182 may be mounted to the PCB 1181, and may be screw-coupled to the coupling member 1130. Under such configuration, the coupling member 1130 and the PCB 1181 can stably contact each other, and the watch-type mobile terminal can be charged more rapidly due to increase of a charging current.

Referring to FIG. 10, a sealing member 2133 for sealing a coupling hole 2101a may be disposed between a head portion 2132 of a coupling member 2130 and a mounting surface 2101b of the coupling hole 2101a, the mounting surface where the head portion 2132 is mounted. The sealing member 2133 may prevent foreign materials such as dust or liquid from being introduced into a mobile terminal 2100 through the coupling hole 2101a.

The sealing member 2133 may be formed of an elastically-transformable material such as rubber and silicon. The coupling member 2130 is screw-coupled to a first case 2101 and a second case 2102. The sealing member 2133 may be configured to be elastically pressed by the head portion 2132 to thus be adhered to the mounting surface 2010b, when the coupling member 2130 is screw-coupled to the first case 2101 and the second case 2102.

The aforementioned structure may be equally applied to mobile terminals 1100 and 2100 of FIGS. 9 and 10 unless it is logically contradictory. For instance, the structure for preventing a mounted state in a reverse direction, which was explained in FIG. 7, may be also applied to the mobile terminals 1100 and 2100 of FIGS. 9 and 10. Further, the structures aforementioned in FIGS. 9 and 10 may combine with each other.

The aforementioned structure may be also applicable to other type of mobile terminal. For instance, an electrical connection structure between a mobile terminal and a mounting device may be applicable not only to a watch-type mobile terminal, but also to various types such as a clip type, a glass type, a bar type, a folder type where two or more bodies are relative-movably coupled to each other, a flip type, a slide type, a swing type and a swivel type.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A watch-type mobile terminal comprising:
   a terminal body including a first case and a second case coupled to each other, the first case and the second case defining an inner space of the terminal body, wherein the terminal body is configured to be mountable to a mounting device that includes a contact pin;
   a printed circuit board disposed in the inner space of the terminal body; and
   a coupling member passing through the printed circuit board, coupling the first case and the second case to each other, wherein the coupling member is electrically connected to the printed circuit board, and wherein the coupling member contacts the contact pin when the terminal body is mounted to the mounting device such that the coupling member and the contact pin electrically connect the printed circuit board and the mounting device to each other.

2. The watch-type mobile terminal of claim 1 further comprising a plurality of coupling members, wherein each of the plurality of coupling members is disposed in a corresponding corner of the terminal body.

3. The watch-type mobile terminal of claim 2, wherein the mounting device comprises a plurality of contact pins, each being formed of a magnetic material, wherein each of the plurality of contact pins corresponds to one of the plurality of coupling members and each of the plurality of coupling members includes a magnetic material, wherein the magnetic polarity between each coupling member and its corresponding contact pin is different such that an attractive force is applied between each coupling member and its corresponding contact pin, and wherein the magnetic polarity between each coupling member and a non-corresponding contact pin is the same such that a repulsive force is applied between each coupling member and the non-corresponding contact pin.

4. The watch-type mobile terminal of claim 1, wherein the first case has a coupling hole formed there through, and wherein a first portion of the coupling member passes through the coupling hole and a remaining head portion of the coupling member contacts the contact pin when the terminal body is mounted to the mounting device.

5. The watch-type mobile terminal of claim 4, further comprising a sealing member disposed between the head portion of the coupling member and a mounting surface of the coupling hole, the sealing member configured to seal the coupling hole.

6. The watch-type mobile terminal of claim 5, wherein the first portion of the coupling member comprises threads, and the first and second cases are screw-coupled by the coupling member, and wherein the sealing member is elastically compressed to seal the coupling hole.

7. The watch-type mobile terminal of claim 4, wherein the head portion of the coupling member has a recess formed therein, the recess configured to receive a protruding portion of the contact pin when the terminal body and the mounting device are coupled to each other.

8. The watch-type mobile terminal of claim 1, wherein the printed circuit board has a hole formed there through and a first portion of the coupling member passes through the hole in the printed circuit board, and wherein the printed circuit board comprises an inner side wall made of an electrically conductive material, the inner side wall formed, at least in part, around the hole in the printed circuit board and providing an electrical connection between the coupling member and a circuit portion of the printed circuit board.

9. The watch-type mobile terminal of claim 8, wherein the printed circuit board comprises a connection portion electrically connecting the inner side wall to the circuit portion of the printed circuit board.

10. The watch-type mobile terminal of claim 9, wherein the connection portion is integrally formed with the circuit portion.

11. The watch-type mobile terminal of claim 1 further comprising a connection member mounted to the printed circuit board, wherein the connection member is electrically connected to a circuit portion of the printed circuit board, wherein the connection member has a hole formed there through, and wherein the printed circuit board has a hole formed there through, the hole through the connection member and the hole through the printed circuit board aligning with each other such that a portion of the coupling member passes through the hole of the printed circuit board and through the hole of the connection member.

12. The watch-type mobile terminal of claim 11, wherein the connection member is mounted to the printed circuit board, and the connection member and the coupling member are threaded such that the connection member and the coupling member are screw-coupled.

13. The watch-type mobile terminal of claim 1, wherein the coupling member includes a magnetic substance such that an attractive force is applied between the coupling member and the contact pin which is formed of a metallic material.

14. The watch-type mobile terminal of claim 1 further comprising a window mounted over a front side opening of the second case, wherein the second case comprises a rear side opening and the first case covers the rear side opening of the second case.

15. A watch-type mobile terminal system, comprising:
   a watch-type mobile terminal; and
   a mounting device having a contact pin, wherein the watch-type mobile terminal and the mounting device are configured such that the watch-type mobile terminal is mountable to the mounting device, wherein the watch-type mobile terminal comprises:

a first case and a second case coupled to each other, the first case and the second case defining an inner space of the watch-type mobile terminal;

a printed circuit board disposed in the inner space of the watch-type mobile terminal; and a coupling member passing through the printed circuit board, coupling the first case and the second case to each other, wherein the coupling member is electrically connected to the printed circuit board, and wherein the coupling member contacts the contact pin when the watch-type mobile terminal is mounted to the mounting device such that the coupling member and the contact pin electrically connect the watch-type mobile terminal and the mounting device to each other.

16. The watch-type mobile terminal system of claim 15, wherein the mounting device further includes a mounting device body and a holding guide protruding from the mounting device body, wherein the configuration of the holding guide corresponds with an outer dimension of the watch-type mobile terminal, and wherein the holding guide is configured to facilitate the mounting of the watch-type mobile terminal to the mounting device.

17. The watch-type mobile terminal system of claim 16, wherein the mounting device comprises a plurality of contact pins, and wherein each of the plurality of contact pins is arranged in a corresponding corner formed by the holding guide.

18. The watch-type mobile terminal system of claim 17, wherein the mounting device comprises a plurality of contact pins, each being formed of a magnetic material, and the watch-type mobile terminal comprises a plurality of coupling members, each being formed of a magnetic material and each corresponding to one of the plurality of contact pins, wherein the magnetic polarity between each coupling member and its corresponding contact pin is different such that an attractive force is applied between each coupling member and its corresponding contact pin, and wherein the magnetic polarity between each coupling member and a non-corresponding contact pin is the same such that a repulsive force is applied between each coupling member and the non-corresponding contact pin.

19. The watch-type mobile terminal system of claim 15, wherein the first case has a coupling hole formed there through, and wherein a first portion of the coupling member passes through the coupling hole and a remaining head portion of the coupling member contacts the contact pin.

20. The watch-type mobile terminal system of claim 19, wherein the contact pin is compressible and tensile along an axial direction, and wherein the contact pin elastically presses against the coupling member.

* * * * *